United States Patent
Konrad et al.

(10) Patent No.: US 12,367,234 B2
(45) Date of Patent: Jul. 22, 2025

(54) GAZE ASSISTED SEARCH QUERY

(71) Applicant: Sesame AI, Inc., San Francisco, CA (US)

(72) Inventors: Robert Konrad Konrad, San Francisco, CA (US); Gordon Wetzstein, Palo Alto, CA (US); Kevin Conlon Boyle, San Francisco, CA (US); John Gabriel Buckmaster, San Jose, CA (US); Nitish Padmanaban, Menlo Park, CA (US)

(73) Assignee: Sesame AI, Inc., San Francisco, CA (US)

( * ) Notice: Subject to any disclaimer, the term of this patent is extended or adjusted under 35 U.S.C. 154(b) by 0 days.

(21) Appl. No.: 18/426,322

(22) Filed: Jan. 29, 2024

(65) Prior Publication Data

US 2024/0419721 A1 Dec. 19, 2024

Related U.S. Application Data

(60) Provisional application No. 63/472,769, filed on Jun. 13, 2023.

(51) Int. Cl.
*G06F 16/00* (2019.01)
*G06F 3/01* (2006.01)
(Continued)

(52) U.S. Cl.
CPC ............ *G06F 16/532* (2019.01); *G06F 3/013* (2013.01); *G06F 16/9535* (2019.01); *G06F 16/9538* (2019.01); *G06T 3/40* (2013.01)

(58) Field of Classification Search
CPC ............ G06F 16/9535; G06F 16/9538; G06F 16/532; G06F 16/951; G06F 3/013; G06F 16/245; G06F 16/2228; G06F 16/436; G06F 3/0481; G06F 3/167; G06F 3/0482; G06F 3/0484; G06T 3/40; H04N 21/434;
(Continued)

(56) References Cited

U.S. PATENT DOCUMENTS

| | | | |
|---|---|---|---|
| 2014/0310256 A1* | 10/2014 | Olsson | G06F 16/951 707/706 |
| 2018/0288477 A1* | 10/2018 | Gupta | H04N 21/434 |

(Continued)

OTHER PUBLICATIONS

PCT International Search Report and Written Opinion, PCT Application No. PCT/US24/33599, Sep. 16, 2024, 16 pages.

*Primary Examiner* — Yicun Wu
(74) *Attorney, Agent, or Firm* — Fenwick & West LLP

(57) ABSTRACT

A system enables a user to query based on a user's gaze by receiving a query from the user and capturing, via an eye tracking system on a headset, the user's gaze location near an object in a local area. The system captures one or more images of the local area with the object and formats the images based in part on a region of interest in the one or more images that includes the object. The system generates a formatted query based in part on the query. The formatted query is provided to a search engine. Information describing the object determined from the one or more formatted images and information describing the query are used by the search engine to determine an answer to the query about the object. The system presents the answer to the query about the object.

20 Claims, 8 Drawing Sheets

(51) Int. Cl.
*G06F 16/532* (2019.01)
*G06F 16/9535* (2019.01)
*G06F 16/9538* (2019.01)
*G06T 3/40* (2006.01)

(58) Field of Classification Search
CPC ......... H04N 21/47217; H04N 21/4755; H04N 21/4858; H04N 21/4828; H04N 21/4316; H04N 21/44218; H04N 21/4532; H04N 21/435
See application file for complete search history.

(56) References Cited

U.S. PATENT DOCUMENTS

| | | | |
|---|---|---|---|
| 2021/0133469 A1* | 5/2021 | Wang | G06V 20/597 |
| 2023/0020886 A1 | 1/2023 | Mahapatra et al. | |
| 2023/0083909 A1 | 3/2023 | Haro | |
| 2024/0403362 A1* | 12/2024 | Kharbanda | G06F 16/7328 |

* cited by examiner

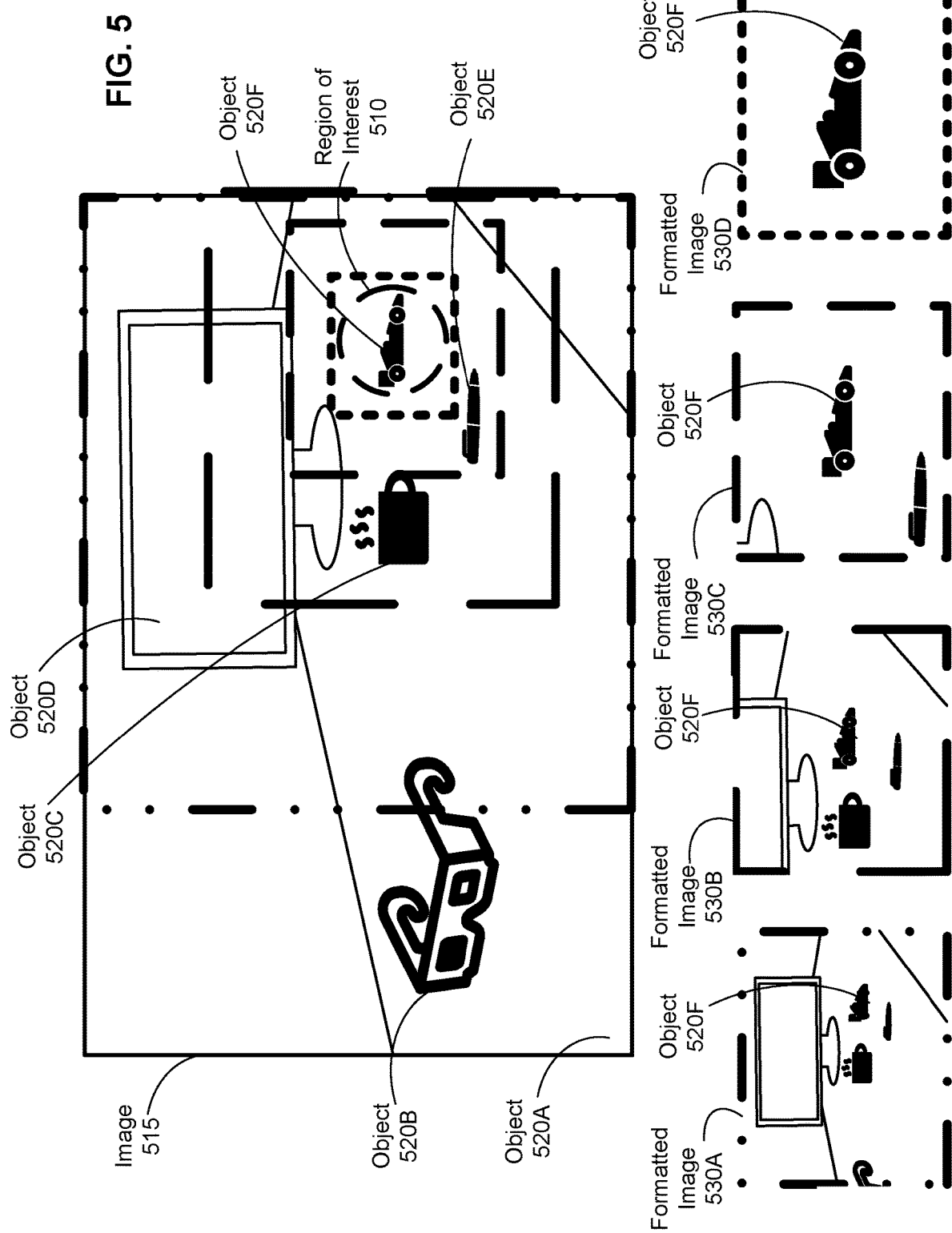

GAZE ASSISTED SEARCH QUERY

CROSS-REFERENCE TO RELATED APPLICATIONS

This application claims the benefit of U.S. Provisional Application No. 63/472,769, filed on Jun. 13, 2023, all of which is hereby incorporated by reference in its entirety.

BACKGROUND

This disclosure relates generally to visual search, and more specifically to gaze assisted search.

Visual search and image recognition is the process of identifying a particular object or feature within an image or a series of images. Conventionally, visual search and image recognition works well when there is a single object in the image. However, when multiple objects are present, user input may be required to identify which item is the object of interest, otherwise, the image may be cluttered with annotations of identified objects. As such, conventional systems generally have the user manually select a region of interest around an object of interest in order to narrow down the visual search to just that object.

SUMMARY

Embodiments of a gaze assisted search system are described. The gaze assisted search system includes a headset, and may also include a client device. The headset may include an eye tracking system, a world facing camera assembly, and a controller. In some embodiments, the headset may also include a display assembly, and audio system, or both. The eye tracking system is configured to determine a gaze location of a user of the headset in accordance with instructions from the controller. The world facing camera assembly includes at least one camera that is configured to capture one or more images of a local area in accordance with instructions from the controller.

In some embodiments, responsive to detecting a trigger, the controller is configured to instruct the eye tracking system to determine the gaze location, instruct the world facing camera assembly to capture one or more images of the local area that include an object associated with the gaze location, and determine a query associated with a trigger. The controller may format the one or more images based in part on a region of interest in the one or more images that includes the object. For example, the controller may adjust (e.g., pixel binning, image rescaling, cropping, image feature embedding, etc.) one or more of the one or more images to reduce sizes and/or change a field of view of the one or more images.

In some embodiments, the controller may provide the one or more formatted images to an object identification system to determine information describing the object (e.g., identifying the object).

The controller may generate a generate a formatted query based in part on the query, and provide the formatted query to a search engine. Information describing the object determined from the one or more formatted images and information describing the query may be used by the search engine to determine an answer to the query about the object. In some embodiments, the search engine is a multi-modal large language model and the formatted query includes one or more formatted images, one or more images, or some combination thereof.

The controller may receive the answer from the search engine. The controller may instruct a component of the system to present the answer to the query about the object. The component (e.g., display assembly, audio assembly, etc.) may be on the headset or the client device.

In some aspects, the techniques described herein relate to a method including: responsive to receiving a trigger from a user, determining a query associated with the trigger, wherein the query is about an object in a local area, determining, via an eye tracking system on a headset, a gaze location of the user on the object, capturing, via a camera on the headset, one or more images of the local area that include the object associated with the gaze location, formatting the one or more images based in part on a region of interest (ROI) in the one or more images that includes the object, generating a formatted query based in part on the query, providing the formatted query to a search engine, wherein information describing the object determined from the one or more formatted images and information describing the query are used by the search engine to determine an answer to the query about the object, and presenting the answer to the query about the object.

In some aspects, the techniques described herein relate to a gaze assisted search system including: an eye tracking system configured to determine a gaze location of a user; a camera configured to capture one or more images of a local area that include an object associated with the gaze location; and a controller including a processor and a non-transitory computer readable storage medium having instructions encoded thereon that, when executed by the processor, cause the controller to: determine a query associated with a trigger, wherein the query is about the object, format the one or more images based in part on a region of interest (ROI) in the one or more images that includes the object, generate a formatted query based in part on the query, provide the formatted query to a search engine, wherein information describing the object determined from the one or more formatted images and information describing the query are used by the search engine to determine an answer to the query about the object, and instruct a component of the gaze assisted search system to present the answer to the query about the object.

In some aspects, the techniques described herein relate to a computer program product including a non-transitory computer readable storage medium having instructions encoded thereon that, when executed by a processor of a computer system, cause the processor to: responsive to receiving a trigger from a user, determine a query associated with the trigger, wherein the query is about an object in a local area, determine, via an eye tracking system on a headset, a gaze location of the user on the object, capture, via a camera on the headset, one or more images of the local area that include the object associated with the gaze location, format the one or more images based in part on a region of interest (ROI) in the one or more images that includes the object, generate a formatted query based in part on the query, provide the formatted query to a search engine, wherein information describing the object determined from the one or more formatted images and information describing the query are used by the search engine to determine an answer to the query about the object, and present the answer to the query about the object.

BRIEF DESCRIPTION OF THE DRAWINGS

FIG. 5 is an example of multi-scale images, according to one or more embodiments.

The figures depict various embodiments for purpose of illustration only. One skilled in the art will readily recognize from the following discussion that alternative embodiments of the structures and methods illustrated herein may be employed without departing from the principles described herein.

DETAILED DESCRIPTION

Figure 1:
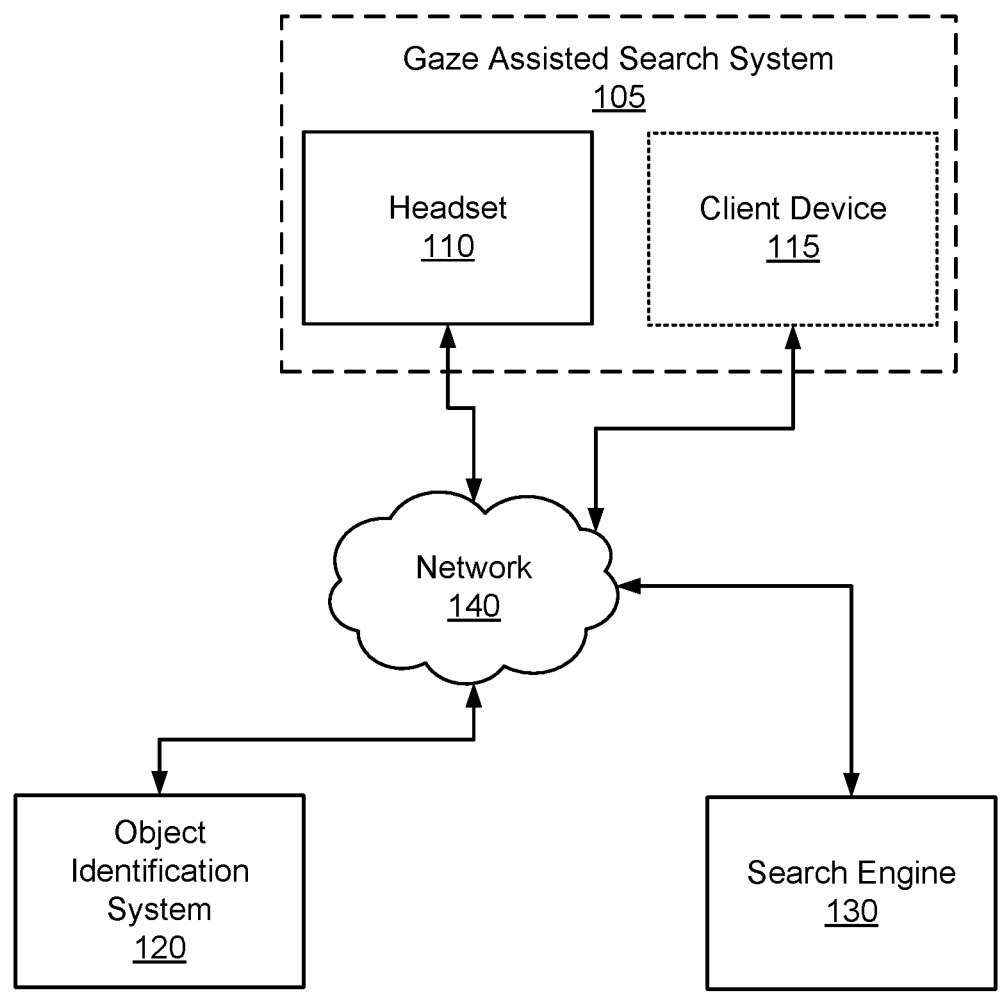
FIG. 1 illustrates an example system environment for a gaze assisted search system, in accordance with one or more embodiments.

FIG. 1 illustrates an example system environment 100 for a gaze assisted search system 105, in accordance with one or more embodiments. The system environment 100 illustrated in FIG. 1 includes the gaze assisted search system 105, an object identification system 120, a search engine 130, and a network 140. Alternative embodiments may include more, fewer, or different components from those illustrated in FIG. 1, and the functionality of each component may be divided between the components differently from the description below. For example, in some embodiments, the functionality of the object identification system 120 may be part of the search engine 130. In other embodiments, the functionality of the object identification system 120, the search engine 130, or both, may be part of the gaze assisted search system 105 (e.g., performed by the headset 110, the client device 115, or some combination thereof). Additionally, each component may perform their respective functionalities in response to a request from a human, or automatically without human intervention.

The gaze assisted search system 105 ("system 105") provides information about objects viewed by the user. The system 105 includes a headset 110, and optionally may also include a client device 115. Some embodiments of system 105 have different components than those described in conjunction with FIG. 1. Additionally, the functionality provided by various components described in conjunction with FIG. 1 may be differently distributed among the components of the system 105 in other embodiments, or be captured in separate assemblies remote from the system 105. For example, in some embodiments, some or all the functionality of the object identification system 120, the search engine 130, or both, are part of system 105 (e.g., performed by the headset 110, the client device 115, or some combination thereof).

Responsive to a trigger (e.g., wake word, press of a button, etc.), the headset 110 captures one or more images of a local area, determines a gaze location of the user within the local area, and determines a query associated with the trigger. The headset 110 captures images of the local area using one or more world facing cameras. The headset 110 determines the gaze location of the user using an eye tracking system. The headset 110 determines a region of interest (ROI) to be a portion of the local area corresponding to the gaze location. The ROI includes an object (e.g., thing, person, landmark, etc.) the user was looking at when the trigger occurred. The headset 110 formats the captured one or more images based in part on ROI in the one or more images. For example, the headset 110 may crop, downsize, rescale, etc., one or more of the images to form smaller images and/or images having different fields of view that include the object at the ROI.

The headset 110 may provide the formatted one or more images to the object identification system 120 in order to determine some information describing the object. The information describing the object may, e.g., identify the object (e.g., the object at the gaze location is an African Violet).

The headset 110 may use the information describing the object to prepare a formatted query to provide to the search engine 130. The formatted query may include, e.g., information describing the object (e.g., from the object identification system 120, the one or more formatted images, the one or more captured images), information describing the query, a prompt, or some combination thereof.

For example, if a trigger did not provide context (e.g., press of a button while the user looked at an object), the headset 110 may generate a formatted query using the information describing the object to obtain answers to one or more pre-determined questions (e.g., "Describe the {identified object}," where the {identified object} is the object identified by the information describing the object).

In embodiments, where there is a spoken query (e.g., "How often do I water that?"), the headset 110 may format the spoken query to convert (e.g., via speech to text conversion) the spoken query to text, such that the text is information describing the spoken query. The headset 110 may then generate a prompt for the search engine 130 using the information describing the object and the information describing the query. For example, if the spoken query is "How often do I water that?" and the information describing the object identifies the object as e.g., an African Violet, the headset 110 may use the text of the spoken query and the information describing the object to generate a prompt of, "How often should an African Violet be watered?" note that this facilitates a user being able to use demonstratives (e.g., that, this, these, and those) in a spoken query, versus having to specifically identify the object in the query.

Note in some embodiments, the headset 110 may generate a prompt using the information describing the query, and use the prompt and the one or more images and/or one or more formatted images to generate a formatted query. The formatted query in this case would be multi-modal, as it could include various combinations of text content, image content, video content, audio content, or any other suitable type of media. The headset 110 may then provide the formatted query to the search engine 130 (e.g., a multi-modal large language model).

The headset 110 provides the formatted query to the search engine 130 via the network 140. The headset 110 receives, via the network 140, an answer to the formatted query from the search engine 130. The headset 110 presents the answer to the user. The headset 110 may present the answer via one or more modalities (e.g., audio, visual, etc.). The headset 110 is described in detail below with regard to FIGS. 2, 7A and 7B.

The client device 115 is a device through the user can interact with the headset 110, and may also interact with the object identification system 120 and/or the search engine 130. The client device 115 can be a personal or mobile computing device, such as a smartphone, a tablet, a laptop computer, or desktop computer. In some embodiments, the client device 115 executes a client application that uses an application programming interface (API) to communicate with the headset 110. In some embodiments, some of the functionality of the headset 110 may be performed by the client device 115. For example, the client device 115 may receive a trigger (e.g., user presses button on client device 115, detects spoken query, etc.), format the images from the one or more world facing cameras, provide the formatted images to the object identification system 120, generate the formatted query, provide the formatted query to the search engine 130, present the answer to the user, or some combination thereof.

The object identification system 120 identifies objects in images. The object identification system 120 receives formatted images from the system 105. The object identification system 120 may use a visual search and/or image recognition algorithm to identify the object in the formatted images, and output information describing the object as text and/or feature embedding. The information describing the object may identify the object. The object identification system 120 provides the information describing the object to the system 105.

The search engine 130 generates answers to formatted queries. Responsive to receiving a formatted query, the search engine 130 processes the formatted query to determine an answer. The search engine 130 may use, e.g., information describing the object determined from the one or more formatted images, information describing the query, or both to determine an answer to the query about the object. The search engine 130 provides the system 105 with the answer to the formatted query. The search engine 130 may be, e.g., a knowledge engine (e.g., GOOGLE, YAHOO, etc.), one or more machine learned models, or some combination thereof.

In some embodiments, the search engine 130 may be one or more machine learned models described herein are large language models (LLMs). In some embodiments, the LLMs use a prompt from the formatted query to generate an answer. In other embodiments, the LLMs are multi-modal (e.g., able to interpret both text and image content), and may use both formatted images and information describing the query in the formatted query to generate an answer.

The LLMs may be trained on a large corpus of training data. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models.

In one instance, the LLM may be trained and deployed or hosted on a cloud infrastructure service. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In some embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

Note that in other embodiments, one or more of the machine-learned models that are LLMs can be configured as any other appropriate architecture including, but not limited to, long short-term memory (LSTM) networks, Markov networks, BART, generative-adversarial networks (GAN), diffusion models (e.g., Diffusion-LM), and the like.

The system 105 (e.g., the headset 110 and optionally the client device 115), the object identification system 120, and the search engine 130 can communicate with each other via the network 140. The network 140 is a collection of computing devices that communicate via wired or wireless connections. The network 140 may include one or more local area networks (LANs) or one or more wide area networks (WANs). The network 140, as referred to herein, is an inclusive term that may refer to any or all of standard layers used to describe a physical or virtual network, such as the physical layer, the data link layer, the network layer, the transport layer, the session layer, the presentation layer, and the application layer. The network 140 may include physical media for communicating data from one computing device to another computing device, such as MPLS lines, fiber optic cables, cellular connections (e.g., 3G, 4G, or 5G spectra), or satellites. The network 140 also may use networking protocols, such as TCP/IP, HTTP, SSH, SMS, or FTP, to transmit data between computing devices. In some embodiments, the network 140 may include BLUETOOTH or near-field communication (NFC) technologies or protocols for local communications between computing devices. The network 140 may transmit encrypted or unencrypted data.

Note that the system 105 can be used in a variety of applications. For example, the user may look at any object (e.g., thing, person, business, park, text, etc.) and ask a question about it—without knowing what the object is. In some embodiments, the query may be to, e.g., look up ratings associated with an object (e.g., restaurant, wine, food, etc.). The system 105 may be able to translate text and/or provide definitions of words to the user. The system 105 may be used for commercial applications as well. For example, a query may be "How much is that?" while the user is looking at an item (e.g., a jacket, food item in store, etc.). In some embodiments, the answer provided by the search engine 130 may also include a link that allows the user to purchase the item from a retailer. In some embodiments, the user may execute the purchase by simply looking at the item while making a specific gesture.

Figure 2:
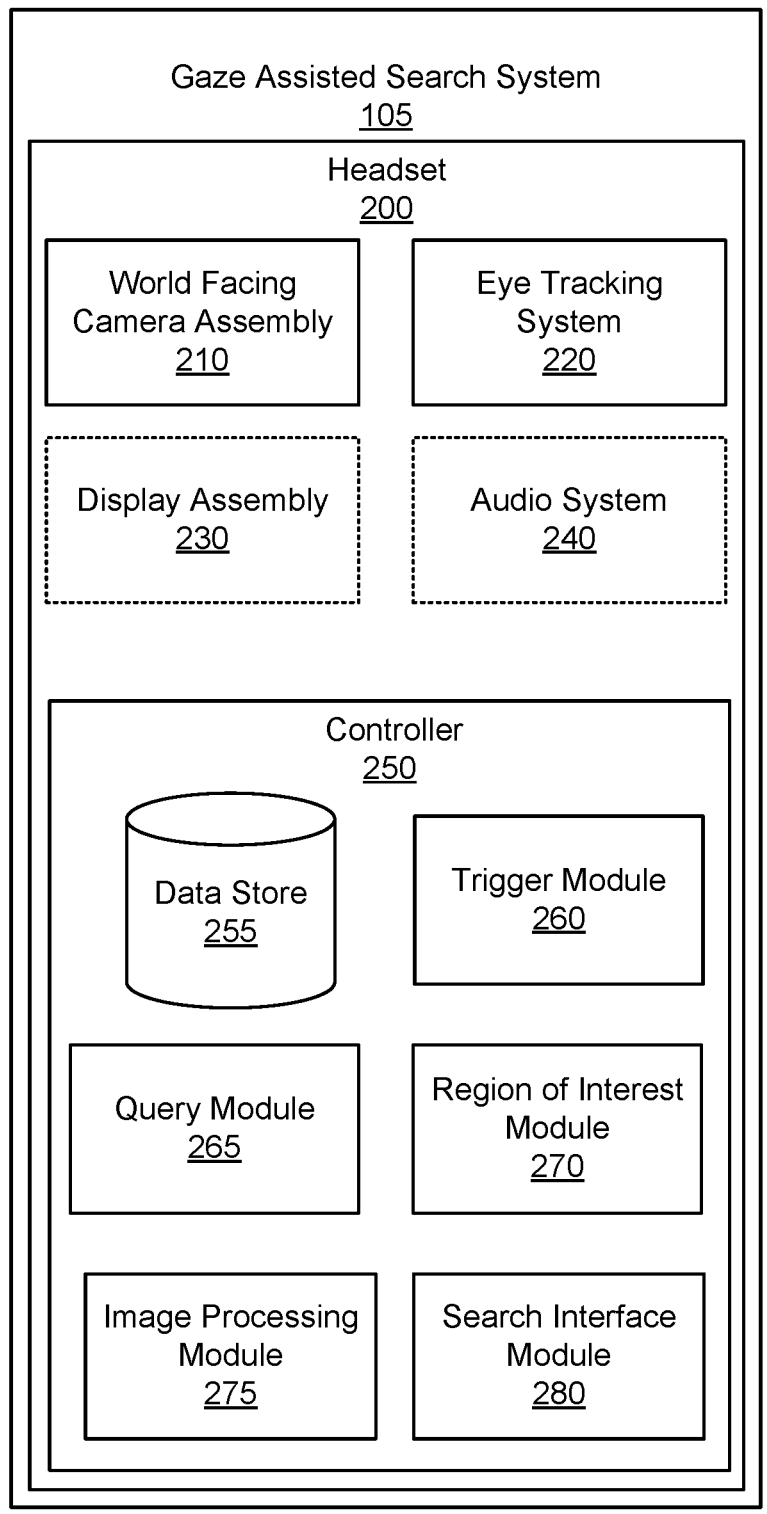
FIG. 2 is a block diagram of a gaze assisted search system, in accordance with one or more embodiments.

FIG. 2 is a block diagram of the system 105, in accordance with one or more embodiments. The system 105 includes a headset 200, and optionally may also include a client device 115 (not shown). The headset 110 is an embodiment of the headset 200. In the embodiment of FIG. 2, the headset 200 includes a world facing camera assembly (WFCA) 210, an eye tracking system 220, a controller 250, and may also include, among other components, a display assembly 230, and an audio system 240. Some embodiments of the headset 200 have different components than those described here. Similarly, in some cases, functions can be distributed among the components in a different manner than is described here.

The WFCA 210 captures images of a local area of the headset 200. The WFCA captures images of the local area using one or more world facing cameras. The one or more world facing cameras are configured to capture images of the local area that include a gaze location of the user. For example, the one or more world facing cameras may be positioned such that a total field of view of the one or more world facing cameras encompasses a field of view of a user of the headset 200. In some embodiments, there is a single world facing camera that images a portion of the local area that includes an entire field of view of the user. In some embodiments, there are a plurality of world facing cameras that have different fields of view of the local area. For example, there may be one or more wide angle world facing cameras, one or more normal perspective world facing cameras, one or more telephoto world facing cameras, etc. In this manner, the plurality of world facing cameras are able to capture images of a same object at a ROI at different fields of view. This is further discussed below with regard to FIG. 5. In other embodiments, the plurality of world facing cameras are the same, but some or all of the plurality of world facing cameras may use, e.g., pixel binning to and/or image rescaling to adjust resolution, crop, images to a particular size and/or field of view. In some embodiments, the world facing camera may include a specialized image sensor that captures multiple fields of view at specific resolutions (e.g., at a relatively low resolution) centered on the user's current gaze location. This may also reduce overall energy consumption because the software layer does not have to process the full resolution image, and is a single image sensor (v. multiple images sensors).

The eye tracking system 220 determines eye tracking information. Eye tracking information may comprise information about a position and an orientation of one or both eyes (within their respective eye-boxes) of a user of the headset 200. In some embodiments, the eye tracking system 220 may determine a vergence of the eyes using the eye tracking information to estimate a depth to which the user is looking. The eye tracking system includes one or more eye tracking sensors. An eye tracking sensor may be, e.g., a red-green-blue camera, an infrared camera, a differential camera, or some combination thereof. The one or more eye tracking cameras capture images of the eyes of the user. The eye tracking system 220 uses the captured images to determine a gaze location of the user (e.g., pixel location in the captured images from the at least one world facing camera). In some embodiments, the eye tracking system 220 may also include one or more illuminators that illuminate one or both eyes. In some embodiments, the eyes are illuminated with an illumination pattern (e.g., structured light, glints, etc.), and the eye tracking system may use the illumination pattern in the captured images to determine the eye tracking information. In some embodiments, the one or more eye tracking sensors are co-aligned light source camera assemblies (LS-CAs), and the illuminators may be, e.g., off-axis infrared (IR) light sources. Some examples of eye tracking using LSCAs, off-axis IR light sources, etc., are described in detail in application Ser. No. 18/368,856, filed on Sep. 15, 2023, which is incorporated by reference in its entirety. In other embodiments, the eye tracking system 220 may use some other means (e.g., contact lens, electrooculography, etc.) as an eye tracking sensor.

The display assembly 230 presents visual content. The display assembly 230 includes one or more display elements. The one or more display elements provide light to a user wearing the headset 200. The headset 200 may include a display element for each eye of a user. In some embodiments, a display element generates image light that is provided to an eyebox of the headset 200. The eyebox is a location in space that an eye of user occupies while wearing the headset 200. For example, a display element may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 200. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. In some embodiments, one or both of the display elements are at least partially transparent, such that light from the local area may be combined with light from the one or more display elements to produce AR and/or MR content.

In some embodiments, a display element does not generate image light, and instead is a lens that transmits light from the local area to the eyebox. For example, one or both of the display elements may be a lens without correction (non-prescription) or a prescription lens (e.g., single vision, bifocal and trifocal, or progressive) to help correct for defects in a user's eyesight. In some embodiments, the display element may be polarized and/or tinted to protect the user's eyes from the sun.

The audio system 240 provides audio content. The audio system 240 includes one or more speakers, and one or more acoustic sensors. The one or more speakers are used to present sound to the user. The one or more acoustic sensors detects sounds within the local area of the headset. An acoustic sensor captures sounds emitted from one or more sound sources (e.g., user's speech) in the local area. For example, the one or more acoustic sensors may be used to detect a wake word, spoken query, etc., said by a user of the headset 200. Each acoustic sensor is configured to detect sound and convert the detected sound into an electronic format (analog or digital). An acoustic sensor may be a microphone, a sound transducer, or similar sensors that are suitable for detecting sounds.

The controller 250 controls the headset 200. In the embodiment of FIG. 2, the controller 250 includes a data store 255, a trigger module 260, a query module 265, a ROI module 270, an image processing module 275, and a search interface module 280. The controller 250 may be located inside a headset, in some embodiments. Some embodiments of the controller 250 have different components than those described here. Similarly, functions can be distributed among the components in different manners than described here. For example, some functions of the controller 250 may be performed external to the headset (e.g., on the client device 115). The user may opt in to allow the controller 250 to transmit data captured by the headset 200 to systems external to the headset 200, and the user may select privacy settings controlling access to any such data.

The data store 255 stores data for use by the headset 200. Data in the data store 255 may include sounds (e.g., spoken queries) recorded in the local area of the headset 200, triggers (e.g., wake words), eye tracking information, gaze location, gaze depth, information describing objects (e.g., images captured by the WFCA 210, formatted images, information from object identification systems), pre-determined queries, information describing spoken queries, answers, and other data relevant for use by the headset 200, or any combination thereof.

The trigger module 260 determines whether a user of the system 105 has provided a trigger. The trigger indicates that the user has a query for the system 105. The trigger may be, e.g., a wake word, selection of a physical button (e.g., on the headset 200 and/or the client device 115), selection of a soft button (e.g., on the headset 200 and/or the client device 115), gaze location in a particular region for at least a threshold period of time, a gesture, opening an app on the client device 115, some other mechanism to indicate the user has a query for the system 105, or some combination thereof. In some embodiments, the audio system 240 detects speech from the user. For example, the trigger module 260 may perform speech-to-text conversion on the speech, and analyze the text to determine if the speech constitutes a trigger. In cases where no trigger is detected, the trigger module 260 continues to monitor for a trigger. In some embodiments, if a trigger is detected, the controller 250 performs trigger actions. In some embodiments, some or all of the trigger actions may be performed concurrent with one another. The trigger actions may include the trigger module 260 instructing the WFCA 210 to capture images of the local area, instructing the eye tracking system 220 to determine a gaze location of the user, and instructing the query module 265 to determine a query. In this manner, the headset 200 can conserve power and/or compute resources by performing the trigger actions after a trigger is detected (v. doing so continually).

The query module 265 identifies a query. In some embodiments, the query is generated by the user. For example, the query is a spoken query that is detected by the audio system 240. The query module 265 may use, e.g., speech-to-text conversion to convert the spoken query to text.

In some embodiments, responsive to a particular action, the query module 265 generates a pre-determined query. In this manner, specific actions of the user may be associated with specific pre-determined queries. The user may be able to assign what pre-determined queries are associated with the specific actions. In some embodiments, responsive to a gaze location of the user remaining at a particular location for at least a threshold period of time, the query module 265 may automatically select a specific query. For example, if the gaze location remains on a particular word for a threshold period of time, the query may be to provide a definition for the word. In another example, responsive to holding a button for a threshold period of time, the query module 265 may generate a query of where to purchase the object at the gaze location.

The ROI module 270 determines a ROI within the captured images. The ROI module 270 uses the captured images from the WFCA 210 and the gaze location from the eye tracking system 220 to determine where the gaze location is in the captured images. The ROI module 270 may set a ROI for the captured images such that it includes an object at the gaze location. In some embodiments, the ROI module 270 may be set the ROI such that it also substantially excludes objects that are not at the gaze location. The ROI module 270 may use the estimated depth to which the user is looking (from the eye tracking system 220) to help determine a size of the ROI.

The image processing module 275 formats images from the WFCA 210 based in part on the ROI. In some embodiments, some or all of the captured images may be at full resolution image (e.g., maximum resolution for a world facing camera). Note that an image of the entire local area may include a lot of information that is not relevant to the query and/or the object in the ROI, especially if the field of view of the image is large. Moreover, processing, transmitting, etc., full size, full resolution images, can take a lot of resources. As such, in some embodiments, the image processing module 275 may format captured images by adjusting (e.g., pixel binning, image rescaling, cropping, image feature embedding (e.g., for processing by a LLM), etc.) some or all of the captured images to reduce sizes of the captured images and/or change a field of view of the captured images. For example, in some embodiments, a captured image may be adjusted such that a portion of the image corresponding to a ROI (i.e., the gaze location of the user) is at a first resolution, and a portion outside the ROI is at a second resolution that is lower than the first resolution. The first resolution may be the full resolution, or some resolution between the full resolution and the second resolution.

In some embodiments, the image processing module 275 may adjust one or more of the captured images to form a plurality of images with different fields of view. For example, an image from a single world facing camera may be adjusted (e.g., cropped, image rescaled) to form images at different fields of view that include the ROI. For example, a single image of the entire local area at full resolution may be adjusted to form a plurality of smaller images that increasingly emphasize the ROI through narrower fields of view. In some embodiments, the image processing module 275 may also adjust (e.g., down sample) the images at the different field of view to be at a resolution lower than full resolution. This is further described below with regard to FIG. 5.

The search interface module 280 may coordinate with an object identification system (e.g., the object identification system 120) to identify an object at the ROI. For example, the search interface module 280 may provide one or more of the formatted images and/or one or more of the captured images to the object identification system, and receive from the object identification system corresponding information describing the object (e.g., identifying the object).

The search interface module 280 generates a formatted query based in part on the query. A formatted query is a query that has been formatted such that it can be parsed by the search engine 130. The search interface module 280 may generate a prompt using text of the query, tokens, a feature embedding, or some combination thereof. For example, the search interface module 280 may generate a prompt using, e.g., the text of the query (e.g., from the query module 265). Note that users often use demonstratives (e.g., this, that, etc.) instead of specifically identifying an object. As such, the search interface module 280 may also generate the prompt based in part on the information describing the object determined using the object identification system. For example, if the text of the query is "How many calories are in that?" and the information describing the object identifies that the object is a "banana," the search interface module 280 may generate a prompt asking "How many calories are in a banana?" The search interface module 280 then provides the formatted query to the search engine 130.

Note that the search interface module 280 generates the prompt in a manner to facilitate parsing by the search engine 130. Accordingly, the search interface module 280 may generate different prompts for different types of search engines. For example, if the search engine 130 is a multi-modal LLM that can parse both text and image content, the search interface module 280 may generate a formatted query that include information describing the query (e.g., text of query) and the one or more formatted images, and have the multi-modal LLM deal with identifying the object using the formatted images, understanding the query in view of the identified object, and answering the query.

The search interface module 280 receives an answer to the formatted query from the search engine 130. The search interface module 280 instructs one or more components of the system 105 to present the answer to the query about the object to the user. The answer may be presented via one or more modalities. For example, the search interface module 280 may be configured to present the answer as audio content via the audio system 240, as visual content (e.g., text, image, video) via the display assembly 230, haptics, etc.

Figure 3:
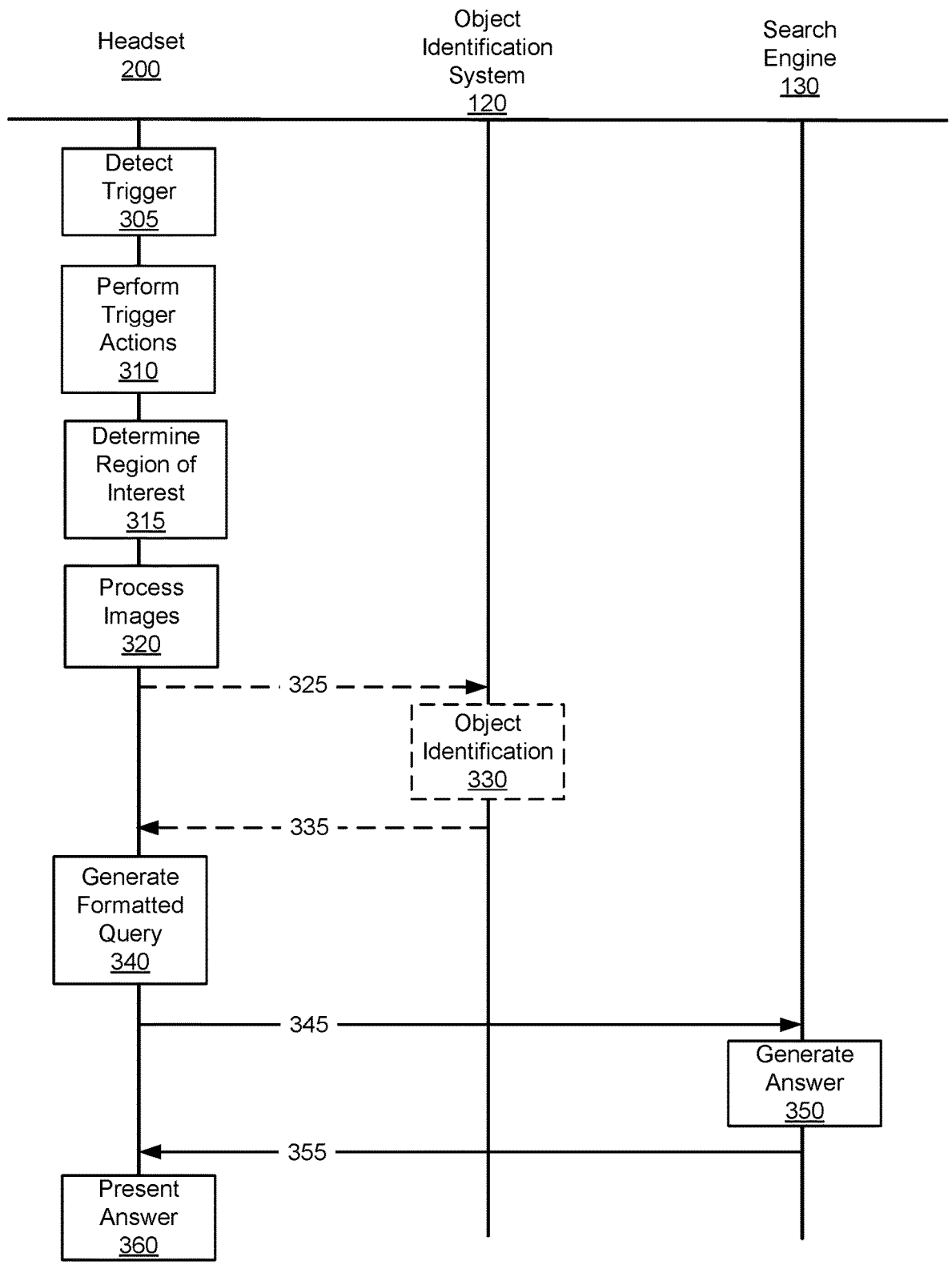
FIG. 3 is an example sequence diagram describing an interaction of various components of a system environment that utilizes a headset of the gaze assisted search system, in accordance with some embodiments.

FIG. 3 is an example sequence diagram describing an interaction of various components of a system environment that utilizes a headset 200 of the system 105, in accordance with some embodiments. Alternative embodiments may include more, fewer, or different interactions from those illustrated in FIG. 3, and the steps may be performed in a different order from that illustrated in FIG. 3.

The headset 200 detects 305 a trigger. For example, the user selects a button, says a wake work, etc. Responsive to the detecting the trigger, the headset 200 performs 310 trigger actions. The trigger actions may be performed concurrent with one another. The trigger actions may include determining a query of the user using the query module 265, capturing one or more images of the local area using the WFCA 210, and determining a gaze location of the user using the eye tracking system 220. The headset 200 then determines 315 a ROI within the captured images based in part on the gaze location. The headset 200 may process 320 images captured by the WFCA 210 to generate one or more formatted images that include the ROI. A formatted image that includes the ROI may be cropped such that it excludes objects that are not in the ROI. Note that this may help, e.g., the object identification system 120 focus on identifying the object in the ROI (v. identifying all objects in the original image captured of the local area). In some embodiments, the formatted image may have a lower resolution than the captured image. Additionally, in some embodiments, there may be a plurality of formatted images having different fields of view that include the ROI.

Figure 4A:
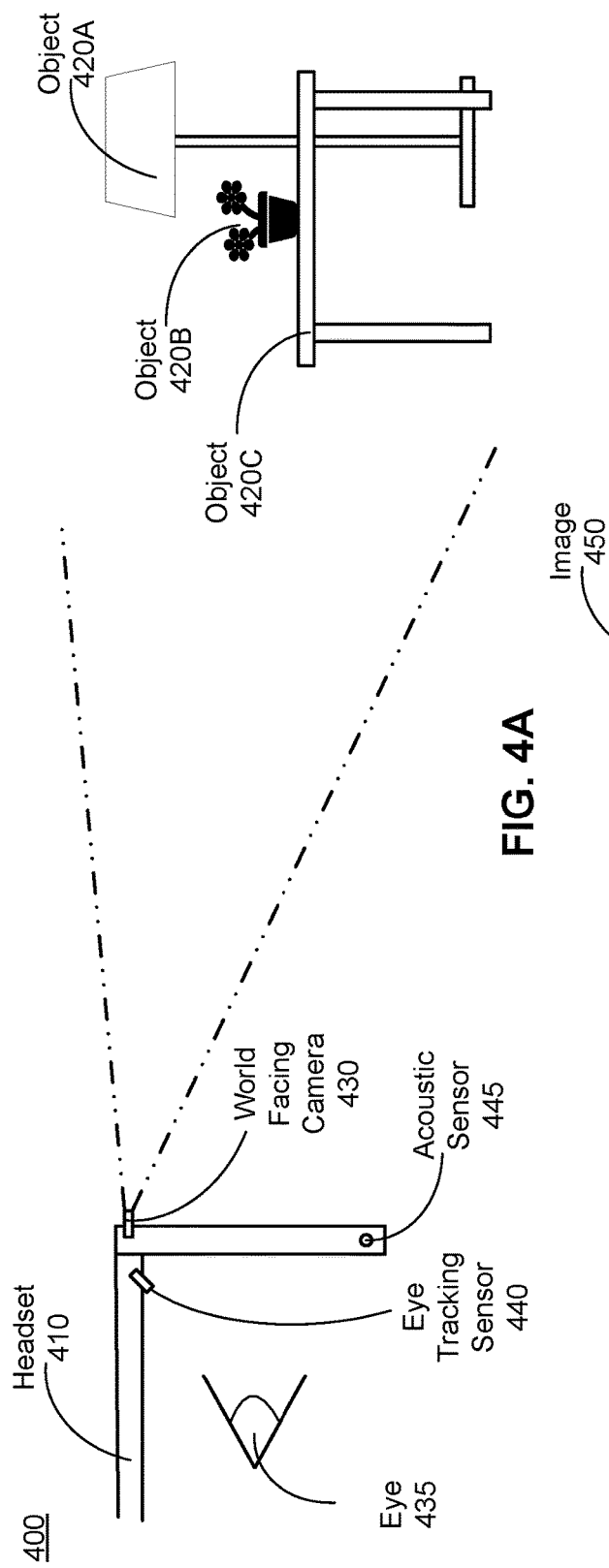
FIG. 4A illustrates a scene that includes a headset in a local area, according to one or more embodiments.
Figure 4B:
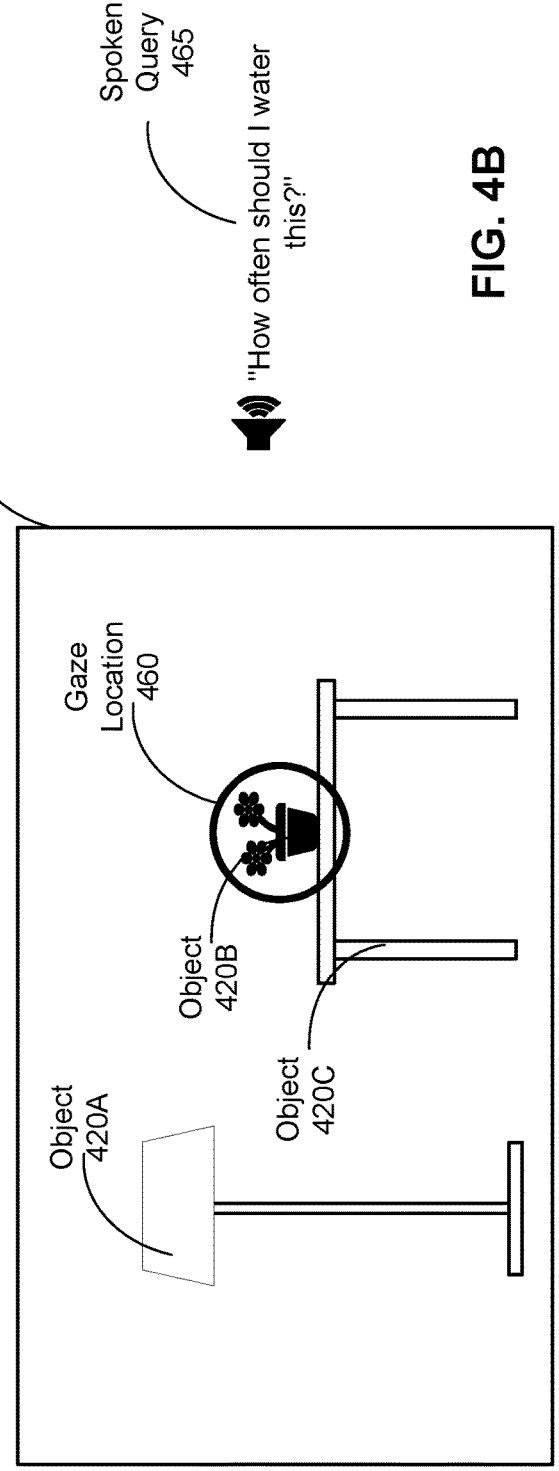
FIG. 4B illustrates example trigger actions performed by the headset of FIG. 4A responsive to a trigger.
Figure 4C:
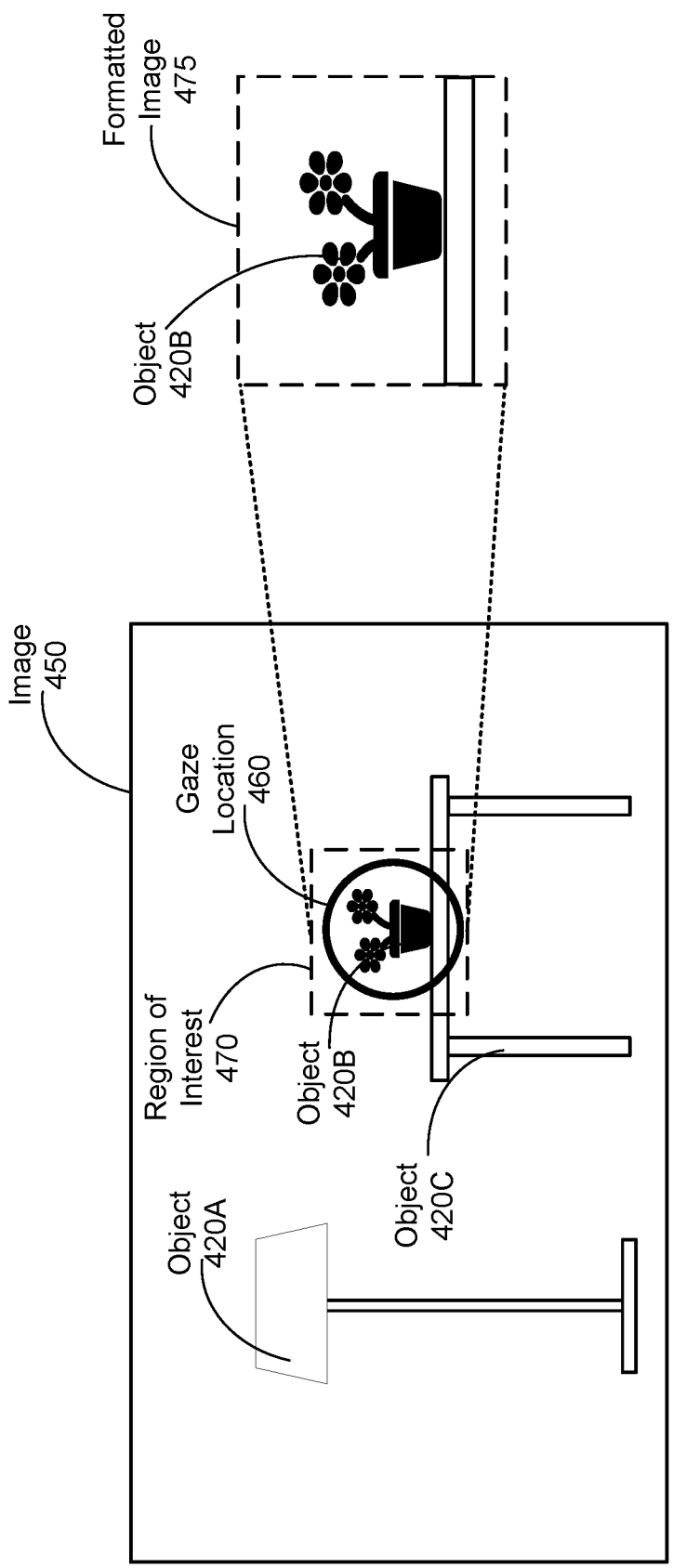
FIG. 4C illustrates generation of a formatted image by the headset of FIG. 4A.

FIGS. 4A-C provide some example context for the above steps. FIG. 4A illustrates a scene 400 that includes a headset 410 in a local area, according to one or more embodiments. The headset 410 is an embodiment of the headset 200. The scene 400 includes a plurality of objects that are in the local area, specifically object 420A, object 420B, and object 420C. The objects 420A, 420B, 420C, are collectively referred to as objects 420. The objects 420 are within a field of view of a world facing camera 430 of the headset 410. And an eye 435 of the user is within a field of view of an eye tracking sensor 440 of the headset 410. The headset 410 includes an acoustic sensor 445 configured to detect sounds in the local area. The sounds may be, e.g., a wake work spoken by the user, a spoken query, etc.

FIG. 4B illustrates example trigger actions performed by the headset 410 of FIG. 4A responsive to a trigger. Once a trigger is detected (e.g., wake word is detected by the acoustic sensor 445), the headset 410 may perform the trigger actions. For example, the headset 410 may use the world facing camera 430 to capture an image 450 of the local area. Responsive to the trigger, an eye tracking system of the headset 410 uses information from the eye tracking sensor 440 to determine a gaze location 460 of the user. The eye tracking system may also use the information from the eye tracking sensor 440 to determine vergence. In the illustrated embodiment, a query posed by the user of the headset 410 is a spoken query 465 (e.g., How often should I water this?"). The headset 410 also determines a query of the user. For example, the headset 410 may use the acoustic sensor 445 to detect the spoken query 465. The headset 410 may convert the spoken query 465 to text.

FIG. 4C illustrates generation of a formatted image 475 by the headset 410 of FIG. 4A. The headset 410 determines a ROI 470 in the image 450 using the gaze location 460. In this embodiment, the headset 410 sizes the ROI 470 such that it includes the gaze location 460 and includes the object 420B, but does not substantially include other objects (e.g., 420A and 420B). The headset 410 may format the image 450 based in part on the ROI 470 to generate a formatted image 475. In this example, the headset 410 adjusts the image 450 to include the object 420B and the ROI 470, while substantially excluding other objects in the image 450 to form the formatted image 475. Note in some embodiments, the headset 410 may also adjust the formatted image 475 such that it is at a lower resolution than the image 450.

Turning back to FIG. 3, in some embodiments, the headset 200 may coordinate with the object identification system 120 to identify an object at the ROI. For example, the headset 200 may provide 325 one or more of the formatted images and/or one or more of the captured images to the object identification system 120. The object identification system 120 may use a visual search and/or image recognition algorithm to identify 330 the object in the formatted images, and output information describing the object as text and/or feature embedding. The object identification system 120 provides 335 the information describing the object to the headset 200.

The headset 200 generates 340 a formatted query based in part on the query. In some embodiments, the headset may generate a prompt using text of the query, tokens, a feature embedding, or some combination thereof. The headset 200 may generate the formatted query using, e.g., the text of the query and the information describing the object determined using the object identification system 120. Note in some embodiments, the search engine 130 may be, e.g., a multi-modal LLM, and the headset 200 may generate a formatted query that includes the one or more formatted images.

The headset 200 provides 345 the formatted query to the search engine 130. The search engine 130 generates 350 and answer to the formatted query. The search engine 130 provides 355 the answer to the headset 200. The headset 200 presents 360 the answer to the user. For example, the headset 200 may display the answer on a display of the headset 200.

FIG. 5 is an example of multi-scale images, according to one or more embodiments. Multi-scale images are images of different fields of view that include an ROI 510 (e.g., based on the gaze location) of a user of the system 105. In the illustrated example, a headset (e.g., the headset 200) of the system 105 captures an image 515 of a local area using a world facing camera. The image 515 includes objects 520A, 520B, 520C, 520D, 520E, and 520F, collectively referred to as objects 520. In this example, the ROI 510 includes the object 520F. The image 515 may be at maximum resolution of the world facing camera. For example, the image 515 may be 5760 pixels×4320 pixels and have a size of ~25 Megapixels.

The system 105 may format the image 515 to obtain a formatted image 530A, a formatted image 530B, a formatted image 540C, and a formatted image 550D, collectively referred to as formatted images 530. Each of the formatted images 530 has a different field of view and includes the object 520F. For example, the formatted image 530A has a field of view that is narrower than the image 515, but is wider than the formatted images 530B-D. And the formatted image 530B has a field of view that is narrower than the field of view of the formatted image 530A, but larger than a field of view of 530C. And the formatted image 530D has a field of view that is narrower than the other formatted images 530A-C. The system 105 may then provide the formatted images 530 to, e.g., the object identification system 120 and/or the search engine 130.

Note that due to the varying fields of view of the formatted images 530 provide views of objects at varying sizes and distance, which can provide context to facilitate in object identification. For example, an object identification system may have problems identifying whether the object 520F is a toy car or a real car from only the formatted image 530D. In contrast, by including the formatted image 530D with other formatted images at different field of views (e.g., formatted images 530A-C) the object identification system is able to receive additional context to help it accurately identify the object 520F.

In some embodiments, each of the formatted images 530 is a much smaller image than the image 515. Continuing with the example above, the formatted images 530 may each be 480 pixels×480 pixels, so in total the four formatted images 530 would have a size of ~0.9 Megapixels, which is much smaller than the size of the image 515 (e.g., ~25 megapixels). Accordingly, the system 105 can also reduce the amount of data to be processed by using the formatted images 530.

Note that while the above discussion is in the context of generating the formatted images 530 from a single image 515, in other embodiments, the formatted images 530 may be generated in some other manner. For example, there may be a world facing camera for each specific field of view. In another example, a single specialized image sensor may be able to capture several low resolution images with several fields of view centered on the user's current gaze concurrently.

Figure 6:
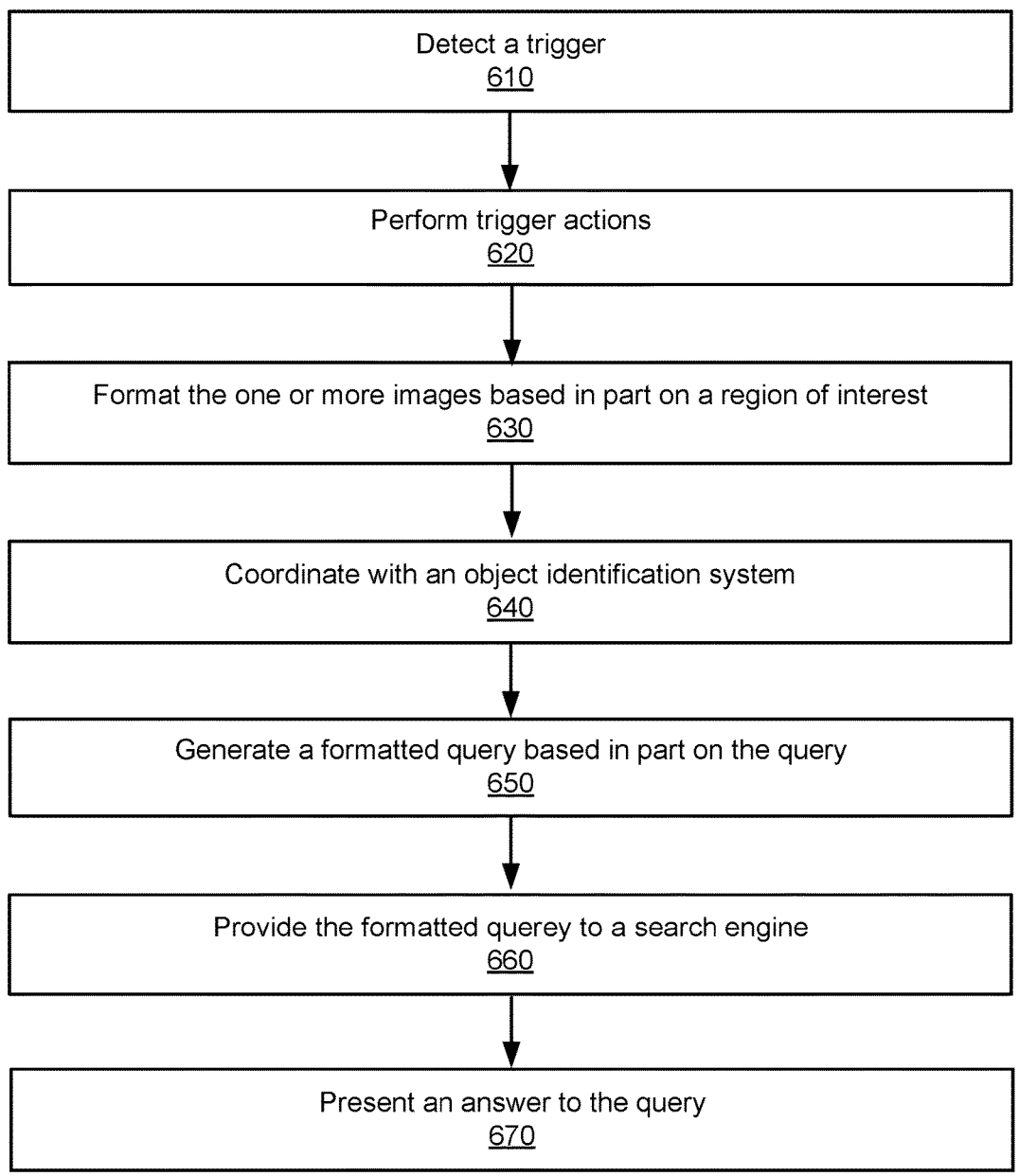
FIG. 6 is a flowchart for a gaze assisted search query, in accordance with one or more embodiments.

FIG. 6 is a flowchart for a gaze assisted search query 600, in accordance with one or more embodiments. The process shown in FIG. 6 may be performed by components of a gaze assisted search system (e.g., the system 105). Other entities may perform some or all of the steps in FIG. 6 in other embodiments. Embodiments may include different and/or additional steps, or perform the steps in different orders.

The system 105 detects 610 a trigger. The trigger may be detected via a headset (e.g., the headset 200) and/or a client device (e.g., the client device 115) of the system 105. The trigger may be provided by the user. For example, the system 105 may detect (via an acoustic sensor) a user speaking a wake word, selection of a physical button (e.g., on the headset and/or the client device), selection of a soft button (e.g., on the headset and/or the client device), gaze location in a particular region for at least a threshold period of time, a gesture, opening an app on the client device, some other mechanism to indicate the user has a query for the system 105, or some combination thereof. Responsive to receiving the trigger, the system 105 performs the following steps.

The system 105 performs 620 one or more trigger actions. Some or all of the trigger actions may be performed concurrent with each other. The trigger actions may include, determining a query associated with the trigger, wherein the query is about an object in a local area of the system 105. In some embodiments, the query is a spoken query and the system 105 detects the spoken query using one or more acoustic sensors. In other embodiments, specific actions of the user may be associated with specific pre-determined queries. And the system 105 determines the query based on an action of the user. Another trigger action for the system 105 may be to determine a gaze location of the user on the object. The system 105 may determine the gaze location using an eye tracking system on the headset. In another trigger action, the system 105 may capture one or more images of the local area that include the object associated with the gaze location. The system 105 may capture the one or more images using one or more world facing cameras.

The system 105 may format 630 the one or more images based in part on a ROI in the one or more images that includes at least part of the object. The ROI is determined using the gaze location of the user. The system 105 may format the one or more images by adjusting (e.g., pixel binning, image rescaling, cropping, image feature embedding (e.g., for processing by a LLM), etc.) some or all of the captured one or more images to reduce sizes of the captured one or more images and/or change a field of view of the captured one or more images. In some embodiments, the system 105 may format the one or more images by down sampling a region outside of the ROI in each of the one or more images, such that a resolution outside the ROI is lower than a resolution inside the ROI for each of the one or more images.

The system 105 may coordinate 640 with an object identification system (e.g., the object identification system 120) to identify an object at the ROI. The system 105 may provide one or more of the formatted images and/or one or more of the captured images to the object identification system. The object identification system may use, e.g., a visual search and/or image recognition algorithm to identify the object in the formatted images, and provide information describing the object as text and/or feature embedding to the system 104.

The system 105 generates 650 a formatted query based in part on the query. In some embodiments, the system 105 may generate a prompt using text of the query, tokens, a feature embedding, or some combination thereof. The system 105 may generate the formatted query using, e.g., the text of the query and the information describing the object determined using the object identification system.

Note in some embodiments, a search engine may be, e.g., a multi-modal LLM, and the system 105 may generate a formatted query that also includes one or more of the formatted images and/or captured images without having to perform step 640.

The system 105 provides 660 the formatted query to a search engine (e.g., LLM). The search engine may use information describing the object determined from the one or more formatted images and information describing the query to determine an answer to the query about the object.

The system 105 presents 670 the answer to the query. The system 105 may present the answer via one or more modalities (e.g., audio, visual, etc.).

Figure 7A:
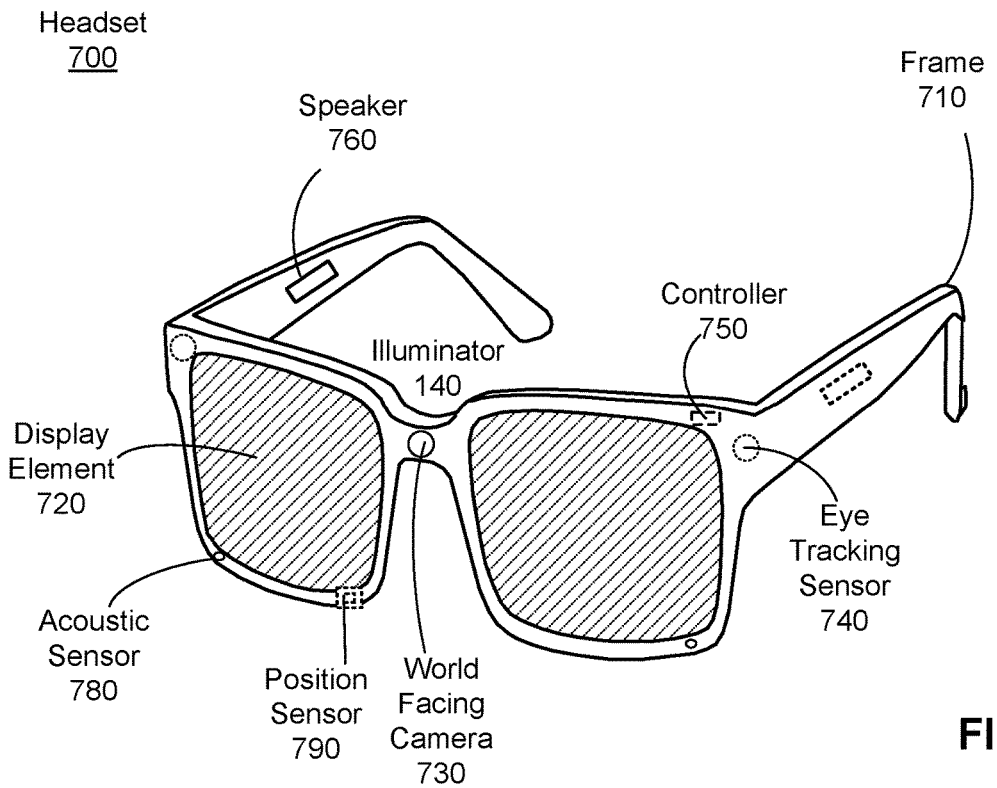
FIG. 7A is a perspective view of a headset implemented as an eyewear device, in accordance with one or more embodiments.

FIG. 7A is a perspective view of a headset 700 implemented as an eyewear device, in accordance with one or more embodiments. In some embodiments, the eyewear device is a near eye display (NED). In general, the headset 700 may be worn on the face of a user such that content (e.g., media content) is presented using a display assembly and/or an audio system. However, the headset 700 may also be used such that media content is presented to a user in a different manner. Examples of media content presented by the headset 700 include one or more images, video, audio, or some combination thereof. The headset 700 includes a frame 710, a WFCA, an eye tracking system, a controller 750, and may include, among other components, a display assembly including one or more display elements 720, an audio system, and a position sensor 790. While FIG. 7A illustrates the components of the headset 700 in example locations on the headset 700, the components may be located elsewhere on the headset 700, on a peripheral device paired with the headset 700, or some combination thereof. Similarly, there may be more or fewer components on the headset 700 than what is shown in FIG. 7A.

The WFCA captures images of a local area of the headset 700. The WFCA is an embodiment of the WFCA 210. The WFCA includes at least one world facing camera 730 that are positioned to capture images of the local area. The at least one world facing camera 730 is configured to capture images of the local area that include a gaze location of the user. The captured image may be a full resolution image (e.g., maximum resolution for the world facing camera 730). While a single world facing camera 730 is shown, in other embodiments, there may be a plurality of world facing cameras. In some embodiments, the plurality of world facing cameras have different fields of view of the local area.

The eye tracking system that determines eye tracking information. The eye tracking system is an embodiment of the eye tracking system 220. The eye tracking system includes one or more eye tracking sensors 740 (e.g., one for each eye). The number and/or locations of the one or more eye tracking sensors 740 may be different from what is shown in FIG. 7A.

The one or more display elements 720 provide light to a user wearing the headset 700. The one or more display elements 720 are part of a display assembly. The display assembly is an embodiment of the display assembly 230.

The audio system provides audio content. The audio system is an embodiment of the audio system 240. The audio system includes one or more speakers 760, and one or more acoustic sensors 780. The one or more speakers 760 are used to present sound to the user. Although the speakers 760 are shown exterior to the frame 710, the speakers 760 may be enclosed in the frame 710. In some embodiments, instead of individual speakers for each ear, the headset 700 includes a speaker array comprising multiple speakers integrated into the frame 710 to improve directionality of presented audio content. The number and/or locations of the speakers may be different from what is shown in FIG. 7A.

The one or more acoustic sensors 780 detects sounds within the local area of the headset 700. An acoustic sensor 780 captures sounds emitted from one or more sound sources in the local area (e.g., the user). In some embodiments, the one or more acoustic sensors 780 may be placed on an exterior surface of the headset 700, placed on an interior surface of the headset 700, separate from the headset 700 (e.g., part of the client device 115), or some combination thereof. The number and/or locations of acoustic sensors 780 may be different from what is shown in FIG. 7A. For example, the number of acoustic detection locations may be increased to increase the amount of audio information collected and the sensitivity and/or accuracy of the information.

The controller 750 controls the headset 700. The controller 750 is an embodiment of the controller 250. The controller 750 may comprise a processor and a computer-readable storage medium. The controller 750 may be configured to have some or all of the functionality of the controller 250.

The position sensor 790 generates one or more measurement signals in response to motion of the headset 700. The position sensor 790 may be located on a portion of the frame 710 of the headset 700. The position sensor 790 may include an inertial measurement unit (IMU). Examples of position sensor 790 include: one or more accelerometers, one or more gyroscopes, one or more magnetometers, another suitable type of sensor that detects motion, a type of sensor used for error correction of the IMU, or some combination thereof. The position sensor 790 may be located external to the IMU, internal to the IMU, or some combination thereof.

Figure 7B:
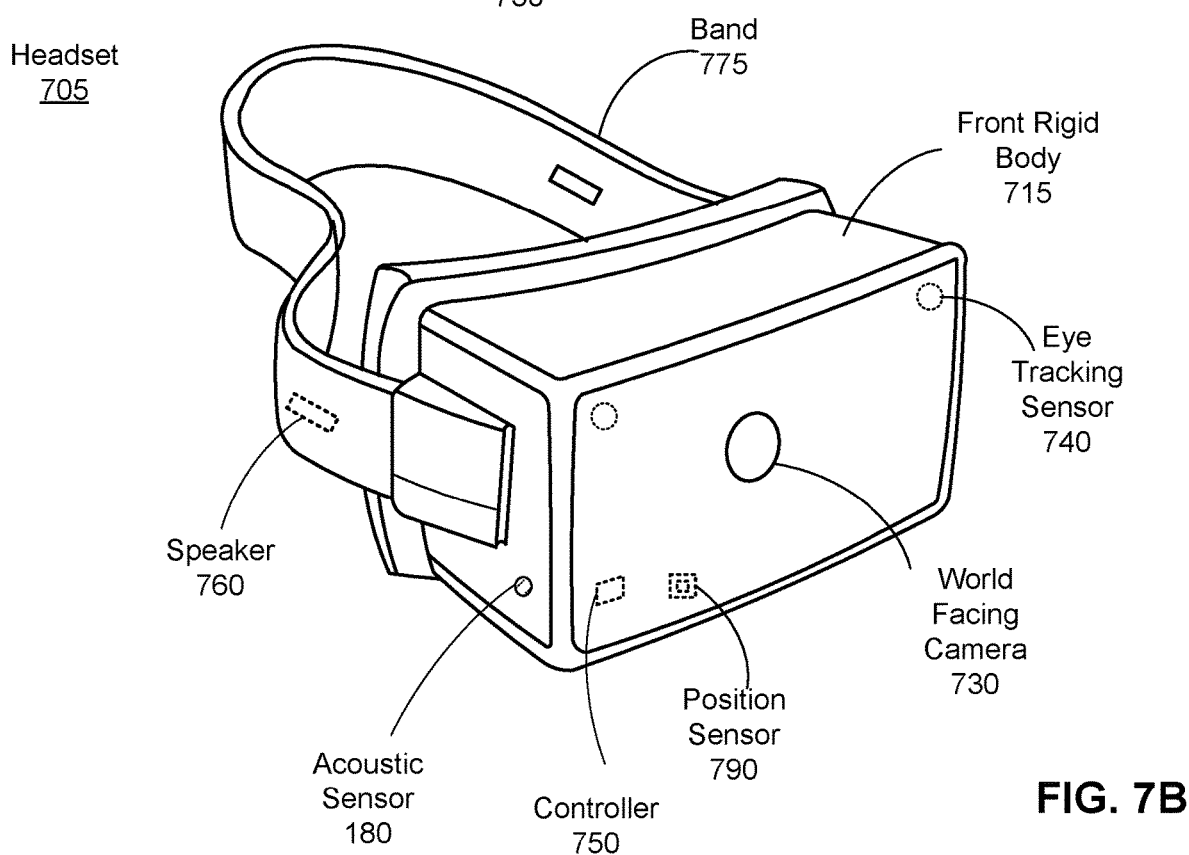
FIG. 7B is a perspective view of a headset implemented as a head mounted display, in accordance with one or more embodiments.

FIG. 7B is a perspective view of a headset 705 implemented as a head mounted display (HMD), in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 715 and a band 775. The headset 705 includes many of the same components described above with reference to FIG. 7A, but modified to integrate with the HMD form factor. For example, the HMD includes the WFCA that includes one or more of the world facing cameras 730, an eye tracking system that includes one or more of the eye tracking sensors 740, the controller 750, a display assembly including one or more display elements 720 (not shown), an audio system, and the position sensor 790. In some embodiments, the placement of the components may vary from what is shown in FIG. 7B.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving a trigger from a user,
   determining a query associated with the trigger, wherein the query is about an object in a local area,
   determining, via an eye tracking system on a headset, a gaze location of the user on the object,
   capturing, via a camera on the headset, one or more images of the local area that include the object associated with the gaze location,
   formatting, based in part on a region of interest (ROI) in the one or more images that includes the object, the one or more images to generate one or more formatted images,
   determining, using the one or more formatted images, information describing the object,
   generating a formatted query using the query and the information describing the object,
   providing the formatted query to a search engine, wherein the information describing the object and information describing the query are used by the search engine to determine an answer to the query about the object, and
   presenting the answer to the query about the object.

2. The method of claim 1, wherein the query is a spoken query that identifies the object in the captured one or more images using a demonstrative.

3. The method of claim 1, wherein the search engine is a large language model.

4. The method of claim 1, wherein formatting the one or more images comprises:
   identifying, using the gaze location, the ROI in the one or more images; and
   adjusting the one or more images to fit the ROI, wherein sizes of the adjusted one or more images are less than sizes of the one or more images.

5. The method of claim 1, wherein the one or more images are a plurality of images, and each of the plurality of images includes the object and has a same resolution, and at least two of the plurality of images have different fields of view.

6. The method of claim 1, wherein formatting the one or more images comprises:
   identifying, using the gaze location, the ROI in the one or more images; and
   generating, using an image of the one or more images, a plurality of images that each includes the object and has a same resolution, and at least two of the plurality of images have different fields of view.

7. The method of claim 1, wherein formatting the one or more images comprises:
   identifying, using the gaze location, the ROI in the one or more images; and
   down sampling a region outside of the ROI in each of the one or more images, such that a resolution outside the ROI is lower than a resolution inside the ROI for each of the one or more images.

8. The method of claim 1, further comprising:
   providing the one or more formatted images to an object identification system in order to determine the information describing the object,
   wherein the query is a spoken query, and generating the formatted query comprises:
      converting the spoken query to text, the text being the information describing the query, and
      generating a prompt based in part on the information describing the object and the information describing the query.

9. The method of claim 1, wherein the search engine is a multi-modal large language model, and providing the formatted query to the search engine further comprises:
   providing at least one of the one or more formatted images to the search engine for determining the answer to the query about the object.

10. The method of claim 1, wherein determining the query associated with the trigger, determining the gaze location of the user on the object, and capturing the one or more images of the local area that include the object associated with the gaze location are performed concurrently.

11. A gaze assisted search system comprising:
   an eye tracking system configured to determine a gaze location of a user;
   a camera configured to capture one or more images of a local area that include an object associated with the gaze location; and
   a controller comprising a processor and a non-transitory computer readable storage medium having instructions encoded thereon that, when executed by the processor, cause the controller to:
      determine a query associated with a trigger, wherein the query is about the object,
      format, based in part on a region of interest (ROI) in the one or more images that includes the object, the one or more images to generate one or more formatted images,
      determine, using the one or more formatted images, information describing the object,
      generate a formatted query using the query and the information describing the object,
      provide the formatted query to a search engine, wherein the information describing the object and information describing the query are used by the search engine to determine an answer to the query about the object, and instruct a component of the gaze assisted search system to present the answer to the query about the object.

12. The system of claim 11, wherein the query is a spoken query that identifies the object in the captured one or more images using a demonstrative.

13. The system of claim 11, wherein the search engine is a large language model.

14. The system of claim 11, wherein the instructions to format the one or more images further comprise instructions that when executed cause the controller to:

identify, using the gaze location, the ROI in the one or more images; and adjust the one or more images to fit the ROI, wherein sizes of the adjusted one or more images are less than sizes of the one or more images.

15. The system of claim 11, wherein the one or more images are a plurality of images, and each of the plurality of images includes the object and has a same resolution, and at least two of the plurality of images have different fields of view.

16. The system of claim 11, wherein the instructions to format the one or more images further comprise instructions that when executed cause the controller to:

identify, using the gaze location, the ROI in the one or more images; and generate, using an image of the one or more images, a plurality of images that each includes the object and has a same resolution, and at least two of the plurality of images have different fields of view.

17. The system of claim 11, wherein the instructions to format the one or more images further comprise instructions that when executed cause the controller to:

identify, using the gaze location, the ROI in the one or more images; and down sample a region outside of the ROI in each of the one or more images, such that a resolution outside the ROI is lower than a resolution inside the ROI for each of the one or more images.

18. The system of claim 11, wherein the controller is further configured to:

provide the one or more formatted images to an object identification system in order to determine the information describing the object, wherein the query is a spoken query, and the instructions to generate the formatted query further comprise instructions that when executed cause the controller to:

convert the spoken query to text, the text being the information describing the query, and generate a prompt based in part on the information describing the object and the information describing the query.

19. The system of claim 11, wherein the search engine is a multi-modal large language model, and the instructions to provide the formatted query to the search engine further comprise instructions that when executed cause the controller to:

provide at least one of the one or more formatted images to the search engine for determining the answer to the query about the object.

20. A computer program product comprising a non-transitory computer readable storage medium having instructions encoded thereon that, when executed by a processor of a computer system, cause the processor to:

responsive to receiving a trigger from a user, determine a query associated with the trigger, wherein the query is about an object in a local area, determine, via an eye tracking system on a headset, a gaze location of the user on the object, capture, via a camera on the headset, one or more images of the local area that include the object associated with the gaze location, format, based in part on a region of interest (ROI) in one or more images that includes the object, the one or more images to generate one or more formatted images, determine, using the one or more formatted images, information describing the object, generate a formatted query using the query and the information describing the object, provide the formatted query to a search engine, wherein the information describing the object and information describing the query are used by the search engine to determine an answer to the query about the object, and present the answer to the query about the object.

* * * * *